Aug. 27, 1968  G. T. BROWN, JR  3,399,402
LUMINESCENT DISPLAY SYSTEM
Filed Oct. 23, 1965
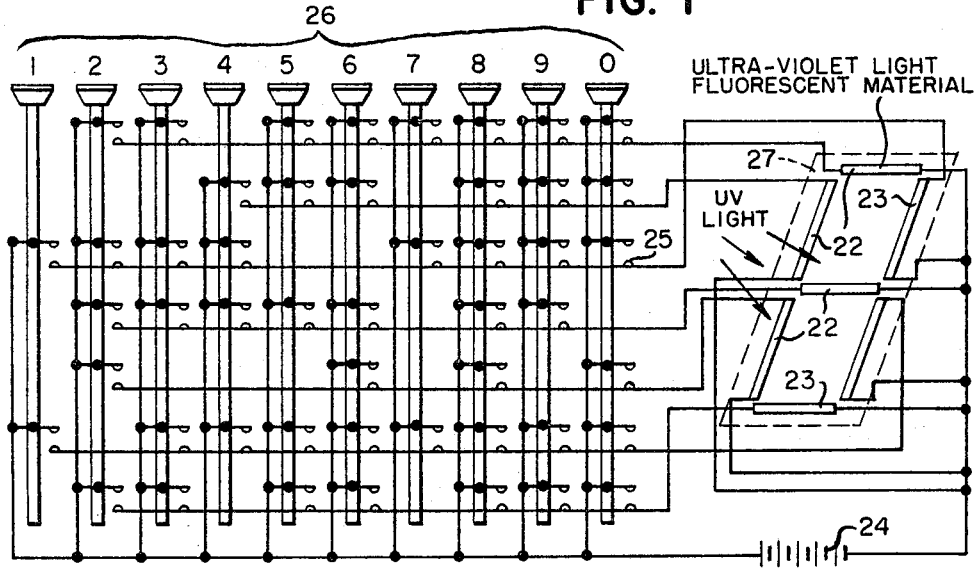
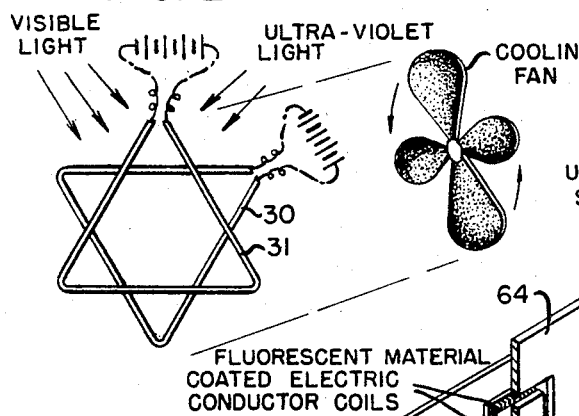
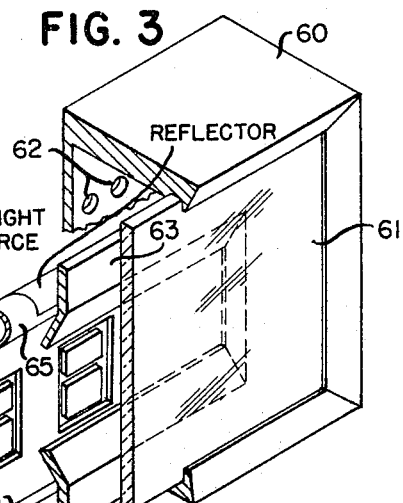
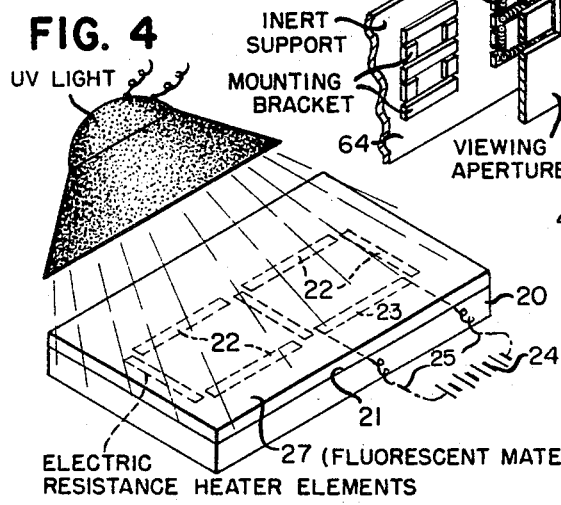
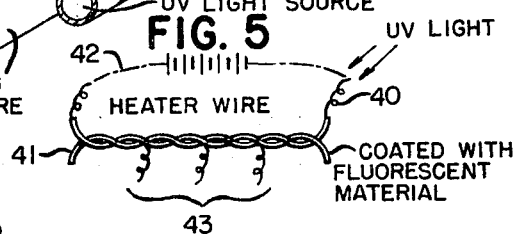
INVENTOR
GEORGE T. BROWN JR.
BY
HIS ATTORNEYS 3,399,402
LUMINESCENT DISPLAY SYSTEM
George T. Brown, Jr., Dayton, Ohio, assignor to The National Cash Register Company, Dayton, Ohio, a corporation of Maryland
Filed Oct. 23, 1965, Ser. No. 503,989
4 Claims. (Cl. 340—324)

ABSTRACT OF THE DISCLOSURE

A display device, the surface of which comprises a fluorescent material which becomes light emissive when and where bathed in ultraviolet light at a normal temperature and which may be selectively quenched when heated to a predetermined temperature above the normal temperature.

---

This invention relates to selectively operable luminous indicators, and more particularly pertains to such indicators that employ fluorescent material(s) and controls for such material in a novel manner by which, by the selective application of ultraviolet light and heat exchange, selected characters or other configurations in highly luminescent state may be provided at will. The fluorescent material used is such that, while it may have a perceivable normal color in incident visible light, it is luminous in the sense of being a fluorescent light-source when and where bathed in ultraviolet light at a normal temperature and is quenched to its normal color when heated to a determined temperature above normal temperature even when continually subjected to the ultraviolet light. The normal temperature usually is room temperature (20 to 25 degrees centigrade) but can be above or below. The indicator also has the property of being erasable and resuming its responsiveness to ultraviolet light upon resuming normal room temperature by heat-exchange with the environment, whether naturally or artificially brought about. The fluorescent material is used in heat-conducting relation to a system of one or more heatable elements, and the differential temperature in or among these heatable elements gives rise to the particular visible luminosity pattern evident when the system is subjected to a bath of ultraviolet light in an all-over, partial, or changing pattern. By differentially controlling the application of light (visible and ultraviolet) as well as the application of heat (and cooling) to the system, a highly selective operation of the novel indicator is possible.

No claim is made to any particular heat-quenchable ultraviolet-light-sensitive fluorescent material, or to the heat-quenching of these materials from an ultraviolet-light-excited state, as such is well known and has been the subject of some development in thermographic systems.

The novelty of this invention is to provide means to control patterns of luminosity by arrangement and control of heating elements, fluorescent material support means, cooling means, and fluorescent material, to the end that brightly luminous selected data can be displayed, changed, and quenched at will.

The invention will be specified in a preferred and other embodiments in conjunction with the drawing, but such specific showings are not to be understood as limiting the breadth of the invention that will subsequently be claimed.

Of the drawing:

FIG. 1 shows a decimal keyboard unit control used in conjunction with a unit of the indicator;

FIG. 2 shows a free-standing overlapping display unit;

FIG. 3 shows a boxed-in indicator utilizing the invention;

FIG. 4 shows an element of a matrix indicator mounted on a heat-sink plate; and

FIG. 5 shows an intertwined resistance wire and coated-indicator-wire type of display unit.

The fluorescent materials used are by definition substantially nonself-luminous in the dark, and may have a slight amount of color-reflectance and luminosity in daylight or artificial visible light caused by visible light absorption, and intense luminosity in ultraviolet light, in which the material acts as a light source. The reflected visible light hue may differ from or be of the same general color value as the fluorescing luminosity, but the fluorescing luminosity is pronounced and intense, so as to be brilliant to the eye even in strong daylight.

For room temperature norm, a superior material of fluorescent properties for use in practicing the invention is zinc cadmium sulfide, which is activated by silver and "poisoned" by nickel, as set forth in the published article "Fluorescent Thermography," by W. H. Byler and F. P. Hays, appearing in the May-June 1961 issue of "Non-Destructive Testing;" and in United States Patents Nos. 2,551,650 (1951) and 2,642,538 (1953), of Franz Urbach. The fluorescent materials preferably used are sensitive to slight changes in temperature as to fluorescing in a given ultraviolet wave range, and, to get an effective environment for the display device, the ambient temperature may be raised or lowered to suit the material, or the fluorescent material may be changed to suit the temperature of use. The ultraviolet light may be adjusted as to wave length and intensity to give the best results in terms of ultraviolet radiation received for unit area. The cooling conditions in terms of rate of change of temperature between the active state of the fluorescing material and its inactive state may be adjusted to determine the quenching time or the receiving time. Where so many factors of adjustment are possible, the choice of conditions is left to the practitioner, and they encompass no more than ordinary adjustments.

In some cases, the time which it takes to change a fluorescing phosphor to the inactive state by cooling is long enough to enable the so-fading display to be blended with a newly selected display, the new display and the fading display being visible in terms of radiant luminosity of varying degrees of brightness or intensity. This variation in heating time of the elements is a function of applied current in the case where the elements are electrically heated.

A most pronounced property of the display device is its property of shining with luminous intensity in an otherwise brightly lighted room.

The fluorescent materials to be used in its most effective state is provided as particles of small dimension (rated in microns) in a minimum amount of binder to be coated wet and dried on the support—be it an electrical conductor or not. The erasing temperature may be generated within the support by flow of electric current or by heat conduction.

The invention may be used with mixtures of phosphors reacting variously as to color, ultraviolet light wave-length response, visible light reflectance, and quenching temperature. The heating of the elements may be brought about by electrical resistance, electrical or magnetic inductance, absorption of radiation, or any similar compatible method of transferring heat energy into the elements. Likewise, the cooling may be static heat conduction of a solid, gas heat conduction if a gas is involved, radiation, or junction electric effect.

The methods of practicing the invention in terms of materials and energy controls having been disclosed in general, the invention will be described first as the preferred embodiment as Example I.

Example I

In this example, which is the preferred example, a substrate of thin electrically nonconductive material 20 (FIG. 4) has attached thereto, on a planar surface 21, a plurality of independent flat wire-like electric resistance heater elements 22, arranged in the matrix configuration resembling a block numeral eight, which can, by choice of those "activated," be made to indicate all of the decimal digits, including zero. Each of the individual elements 22 of the matrix, to activate it, is coupled separately in an electric circuit which normally is open but which can be closed to connect it to a source of electric energy; for instance, the element 23 is connectable with an electric energy source 24 through normally open contacts 25. The contacts for the seven elements 22 are operated individually or in gangs by data-representing keys 26 (FIG. 1) to close the circuits of a correspondingly valued set of the heatable elements 23, so as to establish a temperature pattern among the associated elements that will render any of the specified fluorescent material that will be in heat-conductive contact therewith subject to luminous output when bathed in ultraviolet light except when hot.

In FIG. 4, the selected fluorescent material 27 is represented as a coating layer which completely covers and hides the elements 23 from view but which is in heat-conductive relation with the plate 20 (which acts as a heat sink) and the elements 23. Conduction of heat to and within the support plate is adjusted by choice and dimension of materials, so the heat generated by activated elements is dissipated by heat-conduction very soon after the electric energy is cut off, and the quiescent state of the fluorescent material therefore is reached soon after the cut-off of the electric current. This balancing of materials against the environment is a trial-and-error adjustment that can be made by one skilled in the art to meet the conditions under which the invention is used.

The electric circuit of FIG. 1 is adopted from applicant's prior United States Patent No. 2,715,360, which served a similar matrix in an electric printer construction of a different type. No claim is made to the circuit.

Sequential or simultaneous operation of the digit-representing keys of the device of FIG. 1 results in a corresponding display of a number in terms of darkness against a luminous background of fluorescent material 27. Light reflected from a quenched area because of the intensity of the fluorescent luminosity of the background cannot be seen, although present. This illusion of darkness of the quenched areas is quite striking against a dazzling luminescent background, the lines of demarcation being clean and of high resolution. The coating preferably is as thin as hiding power will permit, so that the heating elements will not be seen. The coating of fluorescent material may be supported on the heatable data-representing elements themselves, as shown in FIGS. 1, 2, 3, and 5.

Example II

This example, disclosed in FIG. 2, is of two superimposed, but electrically insulated, configurations of electrically conductive wire coated with the fluorescent material, comprising triangles 30 and 31, each of which is connected in its own heating circuit and supported extended into space on the lead-in wires. The disconnectable heating circuit is shown in dotted lines. The activation of both of the triangles 30 and 31 with ultraviolet light gives rise to a dynamic display in the form of a luminous star. The triangles and the star will appear in reflected light as of the hue associated with the color absorbence of the coating. Electrical energization of the wires 30 and 31 is followed by a rise in their temperature and loss of luminosity, which may be followed by atmospheric cooling of the elements 30 and 31, as by a fan, to stir the air and carry away the heat, with a return of luminosity. As in Example I, a source of ultraviolet light and a source of visible light, with which the particular display device is to be used to obtain the desired effect, are shown diagrammatically. In some views, one or both of the light sources are omitted. In each instance, however, such sources are to be taken as available.

Example III

The system of Example III (FIG. 5) employs an intertwining extent of an electrically conductive wire 40 and a non-conductive wire 41 coated with the fluorescent material. Electrical connections 42 are provided to be opened and closed at will to energize and deenergize the wire as a whole, but additional circuits 43 to portions of the electrical conductor 40 are furnished to heat a selected portion of the wire 41. In the system of Example III, the ambient atmospheric turbulence around the heated wire is used to cool it in the absence of electric energization. Sectional quenching of a larger luminescent pattern, shown diagrammatically, is of importance in dynamic displays.

Obviously the speed of response in a particular system depends on the speed of electric heating of the selected heatable elements, and their corresponding rates of cooling to obtain the desired rates of visible change in a display; and obviously adjustments may be made to control the rate of change to meet the conditions of use or the properties of the environmental materials.

Example IV

A more detailed version of a display unit incorporating the invention is shown in FIG. 3 within a housing 60 having a glass window 61 and ventilating apertures 62, through which cooling air may be forced. An aperture plate 63 is provided, through which a denominational order framing shield 64 is positioned. The plate 63 has slits, directly behind which are stationed the heater coils of a plurality of matrix configurations of the seven-element variety beforementioned, each configuration representing a decimal denominational order. Each coil is a resistance electric heater coil coated (painted) with the selected fluorescent material, and the coils are arranged in key-controlled circuits, as are those of the denominational arrangement shown in FIG. 1. The coils are mounted on insulating blocks secured to the back plate 64; this permits free circulation of the atmosphere around each. Fluorescent lamps 65 and 66 are positioned behind the shield 63, with windows arranged to cast ultraviolet light on the denominational arrays of coils. With this arrangement, a multidigit number may be displayed.

In all cases of the showing of the invention, the displayed data may be in terms of light and dark, as seen by the eye. Therefore, if the digits displayed in the indicator of FIG. 3 are to be luminous, then the switching arrangement of FIG. 1, if used, will have to be reversed.

It will be apparent that this invention provides a display of dynamic properties, selectively operable at will, to represent desired data in resolute terms as determined by the configuration of selected ones of a plurality of heated elements.

The ultraviolet radiation may be played selectively over the heated elements to encompass all or selected ones thereof for creating luminosity in all or a selected part of the coating except that part thereof which is in contact with a heated element. In all cases, the natural reflectance of the fluorescent material will show in visible light but may be obscured by the dazzling effect.

As in all types of display, the selection of areas for visible effect may be in terms of luminosity or non-luminosity, and the background luminous area may represent the data and the darkened area may represent the last of data.

The heating elements may be made movable with respect to one another and the fluorescent material, and the applied light, whether ultraviolet or visible, may be selectively applied to the observable fluorescent material to further selectively control the display.

What is claimed is:

1. An indicator support means including an indicating surface of ultraviolet-radiation-responsive pigment of the type which is made luminous by incident ultraviolet radiation and quenched by applied heat which acts to raise the temperature of the pigment; pattern element means operable selectively to create data-representing heat patterns in said pigment; means to control said selectively operable pattern element means according to the data to be displayed; and heat-dissipating means associated with the indicating means and controlled to cool the indicating surface, when desired, to erase the data.

2. An indicator support means including an indicating surface of ultraviolet-radiation-responsive pigment of the type which is made luminous by incident ultraviolet radiation and quenched by applied heat which acts to raise the temperature of the pigment; pattern element means operable selectively to create data-representing heat patterns in said pigment; means to control said selectively operable pattern element means according to the data be displayed; and heat-sink means in heat-conducting contact with the indicating surface to increase the temperature contrast between the heat pattern areas and the background area.

3. An indicator support means including an indicating surface of ultraviolet-radiation-responsive pigment of the type which is made luminous by incident ultraviolet radiation and quenched by applied heat which acts to raise the temperature of the pigment; pattern element means operable selectively to create data-representing heat patterns in said pigment; means to control said selectively operable pattern element means according to the data to be displayed; and means to orient the position of the operable means with respect to the indicating surface.

4. In a display device, a plurality of heatable units of predetermined size and shape which may be heated individually selectively to form a hot pattern representative of data; fluorescent material in heat-conducting relation with the heating elements, which fluorescent material is inhibited from fluorescing where an associated element conductively heats it to a determined temperature; a screen having apertures corresponding in size and shape to the heatable units and mounted in nonheat-conducting relation to the heatable units and with the apertures in registry therewith; and a viewable coating of said fluorescent material on said screen whereby when the display is bathed in ultraviolet light such a heated pattern is displayed against the luminous coating of the screen.

References Cited

UNITED STATES PATENTS

| | | | |
|---|---|---|---|
| 2,958,009 | 10/1960 | Bowerman | 340—336 |
| 3,085,154 | 4/1963 | Kelsh | 250—71 |
| 3,219,993 | 11/1965 | Schwertz | 340—324 |
| 3,309,565 | 3/1967 | Clark et al. | 313—109 |
| 3,323,241 | 6/1967 | Blair et al. | 340—336 |

FOREIGN PATENTS

| | | |
|---|---|---|
| 876,365 | 1961 | Great Britain. |

JOHN W. CALDWELL, *Primary Examiner.*

A. J. KASPER, *Assistant Examiner.*